(12) United States Patent
Fischer et al.

(10) Patent No.: US 11,628,620 B2
(45) Date of Patent: Apr. 18, 2023

(54) BOTTOM ELEMENT FOR AN ADDITIVE MANUFACTURING SYSTEM, AND ADDITIVE MANUFACTURING SYSTEM

(71) Applicant: KUMOVIS GMBH, Munich (DE)

(72) Inventors: Stefan Fischer, Iffeldorf (DE); Miriam Haerst, Munich (DE); Stefan Leonhardt, Munich (DE); Sebastian Pammer, Munich (DE)

(73) Assignee: KUMOVIS GMBH, Munich (DE)

( * ) Notice: Subject to any disclaimer, the term of this patent is extended or adjusted under 35 U.S.C. 154(b) by 263 days.

(21) Appl. No.: 16/996,731

(22) Filed: Aug. 18, 2020

(65) Prior Publication Data

US 2021/0053289 A1 Feb. 25, 2021

(30) Foreign Application Priority Data

Aug. 20, 2019 (DE) ..................... 10 2019 122 286.9

(51) Int. Cl.
| | |
|---|---|
| *B29C 64/245* | (2017.01) |
| *B29C 64/364* | (2017.01) |
| *B29C 64/25* | (2017.01) |
| *B22F 12/30* | (2021.01) |
| *B33Y 30/00* | (2015.01) |
| *B29C 64/20* | (2017.01) |

(52) U.S. Cl.
CPC .............. *B29C 64/20* (2017.08); *B22F 12/30* (2021.01); *B29C 64/245* (2017.08); *B29C 64/25* (2017.08); *B29C 64/364* (2017.08); *B33Y 30/00* (2014.12)

(58) Field of Classification Search
CPC ....... B29C 64/20; B29C 64/25; B29C 64/245; B29C 64/118; B29C 64/35; B29C 64/364; B33Y 30/00; B33Y 40/00
See application file for complete search history.

(56) References Cited

U.S. PATENT DOCUMENTS

| | | | |
|---|---|---|---|
| 6,033,301 A | 3/2000 | Suwa | |
| 6,722,872 B1 | 4/2004 | Swanson et al. | |
| 6,817,941 B1 | 11/2004 | Gatov | |
| 2008/0006334 A1* | 1/2008 | Davidson | ................ B29C 64/35 222/630 |
| 2013/0287590 A1* | 10/2013 | Neuhaeusler | ........... B22F 12/00 419/60 |
| 2015/0110911 A1 | 4/2015 | Snyder | |
| 2015/0246485 A1* | 9/2015 | Guenster | ................ B29C 64/25 264/511 |
| 2018/0009007 A1* | 1/2018 | Craft | ...................... B33Y 40/00 |
| 2020/0406546 A1* | 12/2020 | Morganson | ............. B29C 64/20 |

FOREIGN PATENT DOCUMENTS

| | | | | |
|---|---|---|---|---|
| CN | 105170988 A | * | 12/2015 | ............ B22F 3/1055 |
| CN | 105598452 A | * | 5/2016 | |
| CN | 105598452 A | | 5/2016 | |
| CN | 109304468 A | * | 2/2019 | ............. B22F 3/003 |

(Continued)

*Primary Examiner* — Jerzi H Moreno Hernandez
(74) *Attorney, Agent, or Firm* — McCoy Russell LLP

(57) ABSTRACT

An additive manufacturing system, in particular a 3D printer, including a bottom element. The bottom element includes at least one funnel and/or air outlet, wherein at least one sieve and/or grid element is arranged in the area of the funnel and a plate element is arranged opposite the sieve.

9 Claims, 2 Drawing Sheets

(56) References Cited

FOREIGN PATENT DOCUMENTS

| | | |
|---|---|---|
| DE | 10201511504 A1 | 1/2017 |
| DE | 102017122849 A1 | 4/2019 |
| EP | 2261009 A1 | 12/2010 |
| EP | 3023228 A1 | 5/2016 |
| EP | 3173233 A1 | 5/2017 |
| WO | 2016063198 A1 | 4/2016 |
| WO | 2017040675 A1 | 3/2017 |

* cited by examiner

BOTTOM ELEMENT FOR AN ADDITIVE MANUFACTURING SYSTEM, AND ADDITIVE MANUFACTURING SYSTEM

CROSS REFERENCE TO RELATED APPLICATION

The present application claims priority to German Patent Application No. 10 2019 122 286.9 filed on Aug. 20, 2019. The entire contents of the above-listed application is hereby incorporated by reference for all purposes.

TECHNICAL FIELD

The present invention relates to a bottom element for an additive manufacturing system and of an additive manufacturing system, in particular of a 3D printer, as well as to an additive manufacturing system, in particular a 3D printer.

BACKGROUND AND SUMMARY

In connection with the 3D printing of plastics in particular for medical applications (e.g. for implants), the currently achievable component quality is in the focus of many scientific studies. Two challenges, which play a decisive role with regard to component quality, are component tolerance and component sterility or component particle precipitation.

For example, a 3D printing device, in particular an FFF printing device, comprising at least one print head unit is already known from DE 10 2015 111 504 A1, said print head unit being provided in at least one operating state for melting a print material formed at least partially by a high-performance plastic material, in particular a high-performance thermoplastic polymer.

Further, EP 2 261 009 A1 discloses a device and a method for producing a three-dimensional object, said device comprising a vacuum pump coupled to a feed reservoir for generating an air flow through said feed reservoir.

Moreover, EP 3 023 228 A1 shows an additive manufacturing device having a gas flow system in order to provide a gas flow over the area of the build-up platform of the additive manufacturing device.

Furthermore, EP 3 173 233 A1 discloses a three-dimensional manufacturing device with a processing chamber heated by a processing chamber heating unit provided for this purpose.

In addition, U.S. Pat. No. 6,033,301 A discloses a combined fan-filter unit which is provided for filtering the air of an air circuit in a clean room.

U.S. Pat. No. 6,722,872 B1 further shows a three-dimensional modelling device which is intended for building up three-dimensional objects within a heated construction compartment.

In addition, a diffuser for generating a uniform air flow within a process chamber is shown in U.S. Pat. No. 6,817,941 B1, said process chamber being used, for example, in the production of semiconductor chips.

Furthermore, US 2015/110911 A1 shows an environment monitoring or control unit, which is used with additive manufacturing technologies, for example, as an interface to its respective environments.

Besides, WO 2016/063198 A1 shows a method and a device for manufacturing three-dimensional objects by "Fused Deposition Modelling", wherein the manufacturing device comprises radiation heating elements which can heat a surface of the object to be manufactured exposed to them.

In addition, a clean room technology for 3D printers and so-called bio-printers is known from WO 2017/040675 A1.

DE 10 2017 122 849 A1 discloses a fluid supply system for a 3D printer, in particular for an FFF-3D printer.

Further, a method for producing a three-dimensional object with a "Fused Deposition Modelling" printer can be taken from WO 2017/108477 A1.

Based on the solutions proposed in the state of the art, the problem of insufficient component sterility especially for medical applications continues to exist for these additive manufacturing devices.

Furthermore, it is known that in connection with printing, small parts or also residues can fall down due to the influence of gravity and can fall into moving parts such as radiators or into the air system or may no longer be accessible. It is therefore generally desirable to remove this type of contaminations.

It is therefore the object of the present invention to provide a possibility that impurities arising during the printing process can be prevented from having a negative influence on the air system and the preparation of an additive manufacturing system.

This object is achieved according to the invention by a bottom element for an additive manufacturing system comprising the features of claim 1. According to this, provision is made that a bottom element for an additive manufacturing system is provided, in particular for a 3D printer, the bottom element having at least one funnel and/or air outlet, wherein at least one sieve and/or grid element is arranged in the area of the funnel.

In this context, a funnel can be a suitable pipe reduction or a suitable air guiding element by means of which exhaust air can be discharged in particular from the build-up chamber of the additive manufacturing system. In particular, provision may be made that a funnel is constituted by a pipe element having a constriction in its cross-section.

The invention is based on the fundamental idea of collecting any print residues or small parts in a specific manner and correspondingly positioning them by a funnel in such a manner that they can be easily removed and the additive manufacturing system can be easily cleaned. The use of a sieve further makes it possible to collect the small parts and impurities and at the same time to not disturb the function of the air treatment system.

In particular, provision may be made that the funnel is a part of the air routing through which the exhaust air is discharged from the build-up chamber of the additive manufacturing system, i.e. from the printing chamber of the additive manufacturing system.

Furthermore, it may be provided that the funnel comprises a connection element which is connected to an air suction element. This makes it possible, in particular, to suck smaller impurities into the funnel and then collect them on the sieve correspondingly.

The sieve may be designed in particular as a filter and/or pre-filter.

In particular, it is also conceivable that the filter is a particulate filter or similar. In particular, it is conceivable that the filter is a so-called HEPA filter.

It may also be provided for that the sieve is arranged in and/or on the bottom element so as to be detachable and/or removable. This makes it possible to separate the sieve from the bottom element after operation in the cleaning state of the additive manufacturing system and to clean it accordingly.

In principle, it is also conceivable that the entire bottom element is designed to be removable from the additive manufacturing system. In this case, plug connections or bayonet connections or corresponding quick release fasteners are particularly suitable. It is also conceivable that the funnel is designed to be insertable and, like a drawer, can be pulled out and put back in again by pushing it in. The funnel may also rest on a projection or step and be removed from there accordingly.

It may be a particular advantage if the bottom element as a whole is designed to be easily dismantled into its individual parts without the need for tools.

The at least one sieve can be arranged in the mounted state at the bottom side and end side of the funnel. This ensures that contaminants falling down and polymer residues or other print residues can accumulate by gravity in the sieve, namely in the part facing the ground.

This also ensures that impurities can move away from the actual print area accordingly and cannot have any influence there on the component and the corresponding quality of the component.

The funnel may be designed as a circular funnel with a diameter decreasing continuously at least in sections. This ensures that a smaller area may periodically be cleaned. Such a reduction also makes it possible to connect to the air treatment systems of the additive manufacturing system or to the air routing systems accordingly.

The continuously decreasing diameter also makes it possible to reduce from a comparatively large diameter in the build-up chamber to correspondingly smaller diameters.

Standard funnels can also be used, or the production of the funnel is simplified accordingly.

The longitudinal axis of the funnel may be vertically arranged in the mounted and erected state of the bottom element. This enables a simple arrangement. In addition, this may also serve for collecting impurities on the sieve in a particularly effective way, as these are automatically collected on the sieve due to gravity and, for example, in connection with the continuously decreasing diameter of the funnel.

A plate element may be arranged opposite the sieve on the funnel, which is arranged on the funnel by means of one or more struts in such a way that it covers a portion of the funnel inlet. In this way, a corresponding plate is conceivable, on which either a component can be built up or a corresponding component carrier can be placed or arranged.

By using the appropriate struts, it is also possible to use that part of the funnel inlet which remains open as a suction opening for air intake or aspiration from the build-up chamber. This makes it easy to extract impurities next to the plate, which can then be collected in the funnel on the sieve.

In particular, provision may be made that the plate element has a circular design. This allows a particularly simple configuration and production. In addition, it is also possible to provide a uniform aspiration and the corresponding provision of aspiration openings.

The struts may be arranged uniformly and/or in a star shape. The uniform and/or star-shaped arrangement of the struts allows an even introduction of force and load distribution, thus inhibiting plate vibration during operation which may have a negative effect on the printing accuracy.

The present invention further relates to an additive manufacturing system, in particular a 3D printer, comprising at least one bottom element as described above.

BRIEF DESCRIPTION OF FIGURES

Further details and advantages of the invention shall now be explained by means of an exemplary embodiment which is shown in more detail in the drawings in which:

FIG. 1 is drawn to scale, although other relative dimensions may be used, if desired.

DETAILED DESCRIPTION

Figure 1:
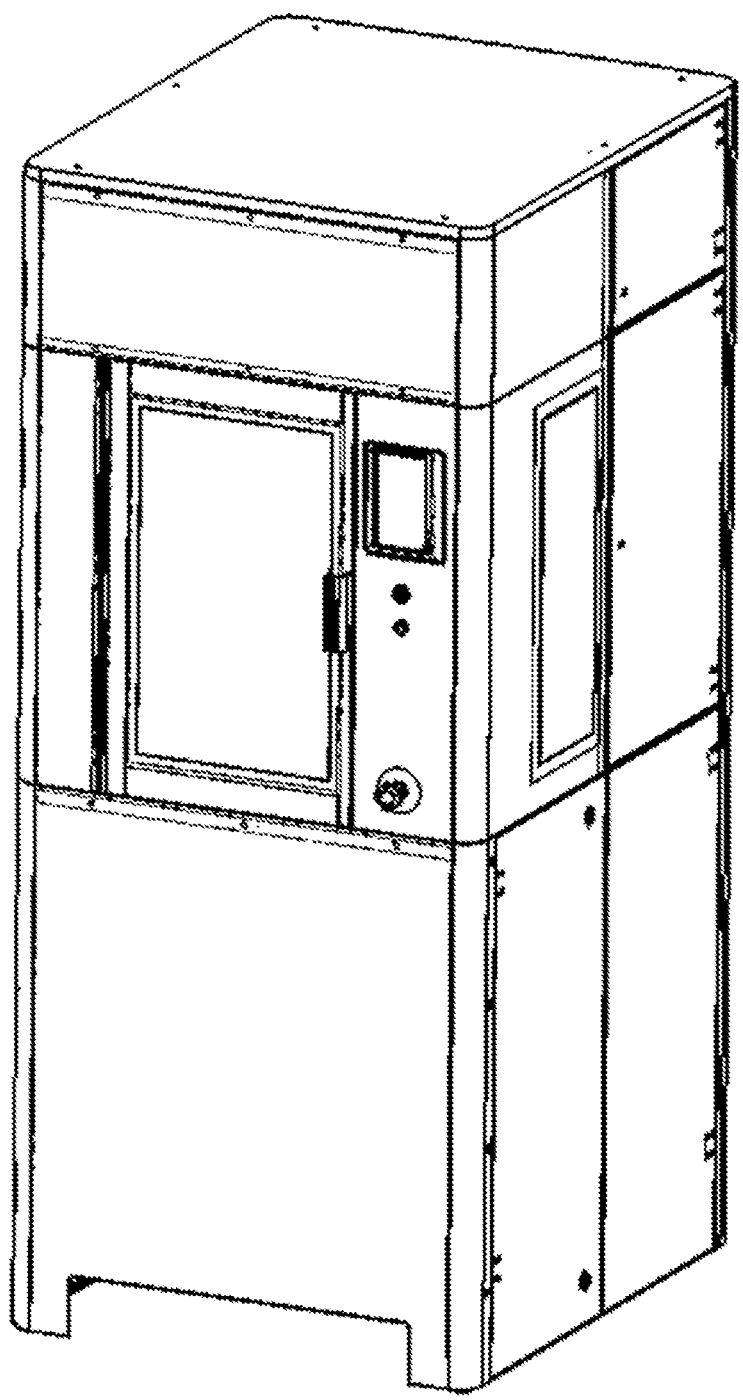
FIG. 1 is a perspective view of an exemplary embodiment of the additive manufacturing system according to the invention.
Figure 2:
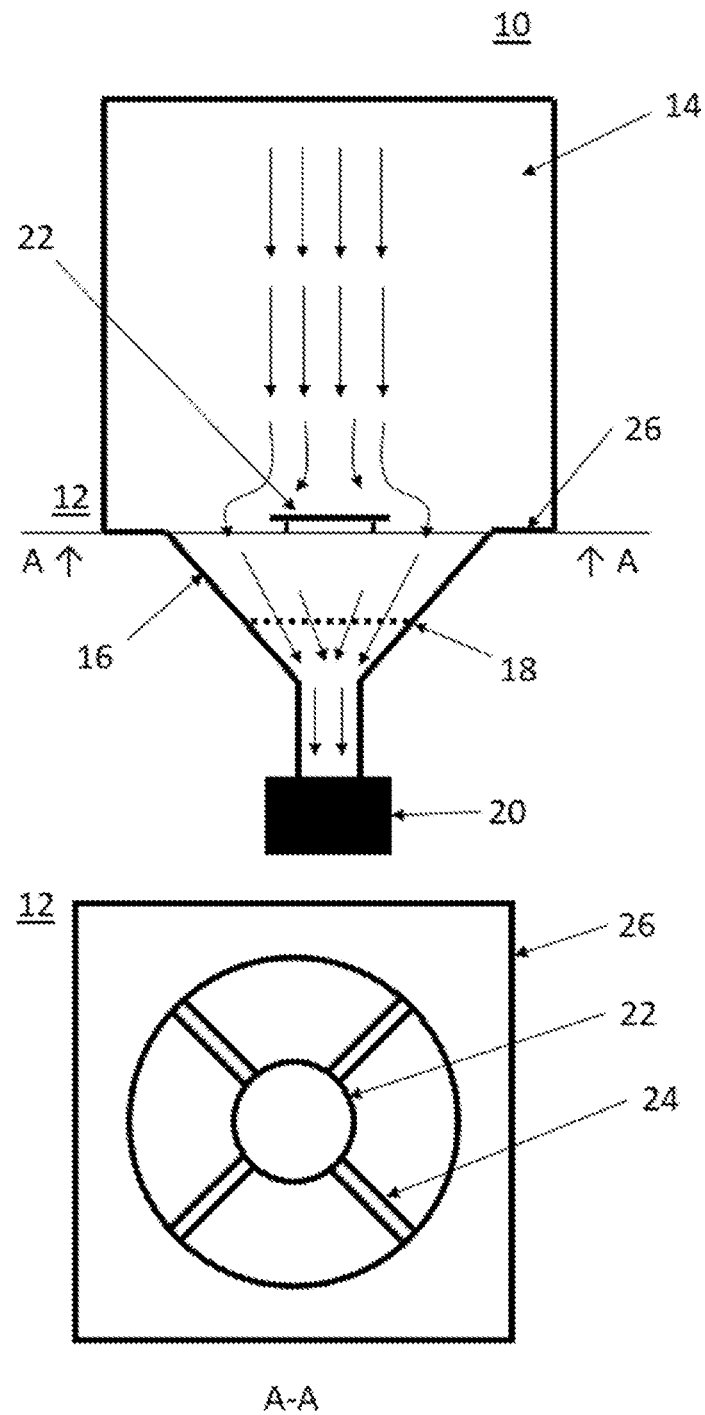
FIG. 2 is a schematic view of the additive manufacturing system according to FIG. 1.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 and FIG. 2 show an additive manufacturing system 10 according to the invention comprising a bottom element 12 according to the invention.

The additive manufacturing system 10 is a 3D printer in the exemplary embodiment shown.

FIG. 2 shows a perspective view of the interior of the build-up chamber 14, in which the print head (not illustrated in more detail) is arranged.

The bottom element 12 including the funnel 16 is arranged in the bottom area of the build-up chamber 14.

The funnel 16 is a circular funnel 16, which has a continuously decreasing diameter over its entire height.

On the bottom side of the funnel 16, a sieve 18 is arranged.

Here, the sieve 18 is arranged at the bottom side and end side of the funnel 16.

The sieve 18 is arranged so as to be detachable and removable from the bottom element 12.

The sieve 18 is a filter or pre-filter. The sieve 18 is also designed as a so-called HEPA filter in an advantageous configuration.

Behind and downstream of the sieve 18, the funnel 16 can be used to establish the connection to the air aspiration or air treatment of the additive manufacturing system 10. Here, the corresponding connection element 20 to the air aspiration of the additive manufacturing system 10 is shown to some extent.

As can be taken from the Figure, the longitudinal axis of the funnel 16 is vertically arranged in the mounted and erected state of the bottom element 12.

It is also evident that opposite the sieve 18 on the funnel 16, a plate element 22 is arranged on the side of the construction space, on which components can be built up.

The plate element 22 has a circular design and is positioned accordingly in the middle of the construction space-side opening of the funnel 16.

This can be seen in particular in section A-A.

The plate element 22 is attached to a carrier plate 26 by means of several struts 24, with the carrier plate 26 delimiting a lower plane of the build-up chamber 14.

The function of the bottom element 12 can be described as follows:

When building up a 3D printed part, corresponding printing residues may occur, which are pushed by the corresponding air supply in the build-up chamber 14 via the plate 22 toward the gaps between the struts 24.

At this place, these are moved toward the sieve 18 by the corresponding air mass flow, but also by gravity, as they fall down in the funnel 16 or are blown by the air mass flow toward the sieve 18.

This ensures that the plate element 22 can be kept clean and free of impurities.

The funnel geometry may also be selected such that the funnel acts as a separator and collects and accumulates dirt residues, impurities and the like. Subsequently, these contaminants are not aspirated by the air flow from the centrifugal fan and can instead be collected in a collecting container and thus easily removed.

REFERENCE NUMERALS

10 additive manufacturing system
12 bottom element
14 build-up chamber
16 funnel
18 sieve
20 connection element
22 plate element
24 struts
26 carrier plate

The invention claimed is:

1. An additive manufacturing system comprising:
   a build-up chamber; and
   a bottom element, wherein the bottom element is arranged in a lower area of the build-up chamber;
   the bottom element comprising:
      a funnel and/or air outlet, wherein at least one sieve and/or grid element is arranged in an area of the funnel; and
      a plate element arranged opposite the at least one sieve and suspended in a center of the funnel by one or more struts attached to a carrier plate, wherein the carrier plate delimits a lower plane of the build-up chamber.

2. The additive manufacturing system according to claim 1, wherein the funnel comprises a connection element which is connected to an air suction element.

3. The additive manufacturing system according to claim 1, wherein the at least one sieve is designed as a filter and/or pre-filter.

4. The additive manufacturing system according to claim 1, wherein the at least one sieve is arranged in and/or on the bottom element so as to be detachable and/or removable.

5. The additive manufacturing system according to claim 1, wherein the at least one sieve, in a mounted state, is arranged at a bottom side and end side of the funnel.

6. The additive manufacturing system according to claim 1, wherein the funnel is a circular funnel with a diameter decreasing continuously at least in sections.

7. The additive manufacturing system according to claim 5, wherein a longitudinal axis of the funnel is vertically arranged in the mounted state of the bottom element.

8. The additive manufacturing system according to claim 1, wherein the plate element is circular.

9. The additive manufacturing system according to claim 1, wherein the struts are arranged uniformly and/or in a star shape.

* * * * *